(12) United States Patent
Zhang et al.

(10) Patent No.: US 12,507,317 B2
(45) Date of Patent: Dec. 23, 2025

(54) METHODS AND APPARATUSES FOR A SCG DEACTIVATION MECHANISM AND A SCG ACTIVATION MECHANISM IN A MR-DC SCENARIO

(71) Applicant: Lenovo (Beijing) Limited, Beijing (CN)

(72) Inventors: Congchi Zhang, Shanghai (CN); Mingzeng Dai, Shanghai (CN); Lianhai Wu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 345 days.

(21) Appl. No.: 18/250,056

(22) PCT Filed: Oct. 22, 2020

(86) PCT No.: PCT/CN2020/122757
§ 371 (c)(1),
(2) Date: Apr. 21, 2023

(87) PCT Pub. No.: WO2022/082584
PCT Pub. Date: Apr. 28, 2022

(65) Prior Publication Data
US 2023/0397297 A1 Dec. 7, 2023

(51) Int. Cl.
*H04W 4/00* (2018.01)
*H04W 72/231* (2023.01)
(Continued)

(52) U.S. Cl.
CPC ......... *H04W 76/34* (2018.02); *H04W 72/231* (2023.01); *H04W 76/38* (2018.02)

(58) Field of Classification Search
CPC ... H04W 76/34; H04W 76/38; H04W 72/231; H04W 76/16
See application file for complete search history.

(56) References Cited

U.S. PATENT DOCUMENTS

| 12,356,478 B2 * | 7/2025 | Wang | H04L 1/0025 |
| 2011/0170420 A1 * | 7/2011 | Xi | H04L 5/0032 370/328 |

(Continued)

FOREIGN PATENT DOCUMENTS

| CN | 110198553 A | 9/2019 |
| CN | 111277399 A | 6/2020 |

(Continued)

OTHER PUBLICATIONS

PCT/CN2020/122757, "International Preliminary Report on Patentability", PCT Application No. PCT/CN2020/122757, May 4, 2023, 5 pages.

(Continued)

*Primary Examiner* — Abdelnabi O Musa
(74) *Attorney, Agent, or Firm* — FIG. 1 Patents

(57) ABSTRACT

Embodiments of the present application relate to methods and apparatuses for a secondary cell group (SCG) deactivation mechanism and a SCG activation mechanism in a multi-radio dual connectivity (MR-DC) scenario under a 3rd Generation Partnership Project (3GPP) 5G New Radio (NR) system or the like. According to an embodiment of the present application, a method can include: in response to detecting user data volume decrease or user data inactivity at a SCG, deciding to deactivate the SCG; and in response to deciding to deactivate the SCG, performing a SCG deactivation procedure.

20 Claims, 5 Drawing Sheets

(51) Int. Cl.
    *H04W 76/34* (2018.01)
    *H04W 76/38* (2018.01)

(56) References Cited

U.S. PATENT DOCUMENTS

| | | | | |
|---|---|---|---|---|
| 2017/0127473 A1* | 5/2017 | Virtej | ............... | H04W 36/0069 |
| 2022/0030659 A1* | 1/2022 | Kim | ...................... | H04W 28/06 |
| 2022/0046522 A1* | 2/2022 | Kim | ...................... | H04W 48/16 |
| 2023/0122107 A1* | 4/2023 | Zhang | .................. | H04W 72/23 370/329 |
| 2023/0199881 A1* | 6/2023 | Freda | ...................... | H04L 5/001 370/329 |

FOREIGN PATENT DOCUMENTS

| | | |
|---|---|---|
| CN | 111698768 | 9/2020 |
| WO | 2015197904 A1 | 12/2015 |

OTHER PUBLICATIONS

PCT/CN2020/122757, "International Search Report and Written Opinion", PCT Application No. PCT/CN2020/122757, Jul. 15, 2021, 6 pages.

20958167.7, "European Search Report", Application No. 20958167.7, Jun. 20, 2024, 9 pages.

Huawei, Hisilicon, "Discussion on SCG deactivation and activation", 3GPP TSG-RAN WG2 #111-e R2-2007678 Mobile Competence Centre; 650, Route Des Lucioles; F-06921 Sophia-Antipolis Cedex; France, Aug. 17, 2020, 3 pages.

Qualcomm Incorporated, "Further discussion on suspension of SCG", 3GPP TSG RAN WG2 Meeting #108 R2-1914364 Mobile Competence Centre; 650, Route Des Lucioles; F-06921 Sophia-Antipolis Cedex; France, Nov. 18, 2019, 10 pages.

* cited by examiner

METHODS AND APPARATUSES FOR A SCG DEACTIVATION MECHANISM AND A SCG ACTIVATION MECHANISM IN A MR-DC SCENARIO

TECHNICAL FIELD

Embodiments of the present application generally relate to wireless communication technology, especially to methods and apparatuses for a secondary cell group (SCG) deactivation mechanism and a SCG activation mechanism in a multi-radio dual connectivity (MR-DC) scenario.

BACKGROUND

Next generation radio access network (NG-RAN) supports a MR-DC operation. In the MR-DC operation, a user equipment (UE) with multiple transceivers may be configured to utilize resources provided by two different nodes connected via non-ideal backhauls. Wherein one node may provide NR access and the other one node may provide either evolved-universal mobile telecommunication system (UMTS) terrestrial radio access (UTRA) (E-UTRA) or NR access. One node may act as a master node (MN) and the other node may act as a secondary node (SN). The MN and SN are connected via a network interface (for example, Xn interface as specified in 3GPP standard documents), and at least the MN is connected to the core network.

The 3rd Generation Partnership Project (3GPP) 5G system or network adopts a MRO mechanism. However, details regarding a SCG deactivation mechanism and a SCG activation mechanism in a MR-DC scenario have not been discussed in 3GPP 5G technology yet.

SUMMARY

Some embodiments of the present application provide a method for wireless communications. The method may be performed by a UE, a MN, or a SN. The method includes: in response to detecting user data volume decrease or user data inactivity at a SCG, deciding to deactivate the SCG; and in response to deciding to deactivate the SCG, performing a SCG deactivation procedure.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method for performing a SCG deactivation procedure.

Some embodiments of the present application provide a further method for wireless communications. The method may be performed by a UE, a MN, or a SN. The method includes: in response to detecting a high user data volume or in response to detecting a packet arrival at a SCG radio bearer or in response to detecting a MN link failure, deciding to activate the SCG; and in response to deciding to activate the SCG, performing a SCG activation procedure.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned further method for performing a SCG activation procedure.

The details of one or more examples are set forth in the accompanying drawings and the descriptions below. Other features, objects, and advantages will be apparent from the descriptions and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
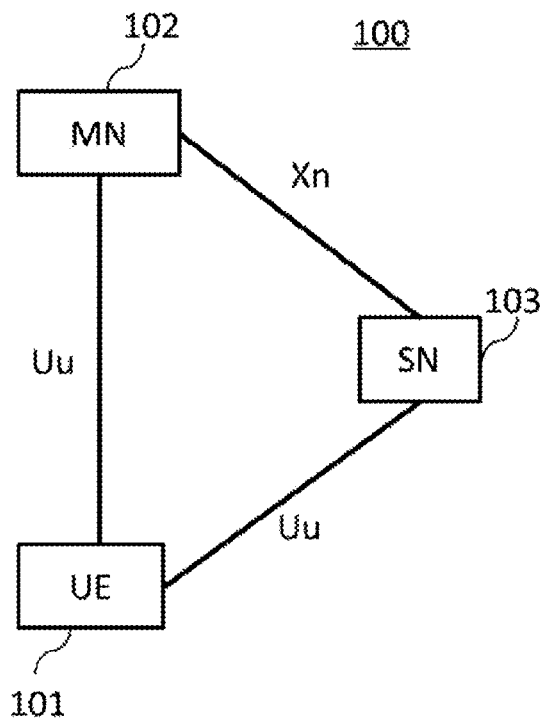
FIG. 1 illustrates a schematic diagram of a wireless communication system in accordance with some embodiments of the present application.

FIG. 1 illustrates a schematic diagram of a wireless communication system in accordance with some embodiments of the present application.

As shown in FIG. 1, the wireless communication system 100 may be a dual connectivity system 100, including at least one UE 101, at least one MN 102, and at least one SN 103. In particular, the dual connectivity system 100 in FIG. 1 includes one shown UE 101, one shown MN 102, and one shown SN 103 for illustrative purpose. Although a specific number of UEs 101, MNs 102, and SNs 103 are depicted in FIG. 1, it is contemplated that any number of UEs 101, MNs 102, and SNs 103 may be included in the wireless communication system 100.

Referring to FIG. 1, UE 101 may be connected to MN 102 and SN 103 via a network interface, for example, the Uu interface as specified in 3GPP standard documents. MN 102 and SN 103 may be connected with each other via a network interface, for example, the Xn interface as specified in 3GPP standard documents. MN 102 may be connected to the core network via a network interface (not shown in FIG. 1). UE 102 may be configured to utilize resources provided by MN 102 and SN 103 to perform data transmission.

MN 102 may refer to a radio access node that provides a control plane connection to the core network. In an embodiment of the present application, in the E-UTRA-NR Dual Connectivity (EN-DC) scenario, MN 102 may be an eNB. In another embodiment of the present application, in the next generation E-UTRA-NR Dual Connectivity (NGEN-DC) scenario, MN 102 may be an ng-eNB. In yet another embodiment of the present application, in the NR-E-UTRA Dual Connectivity (NE-DC) scenario or the NR-NR Dual Connectivity (NR-DC) scenario, MN 102 may be a gNB.

MN 102 may be associated with a MCG. The MCG may refer to a group of serving cells associated with MN 102, and may include a primary cell (PCell) and optionally one or more secondary cells (SCells) of the MCG. The PCell may provide a control plane connection to UE 101.

SN 103 may refer to a radio access node without a control plane connection to the core network but providing additional resources to UE 101. In an embodiment of the present application, in the EN-DC scenario, SN 103 may be an en-gNB. In another embodiment of the present application, in the NE-DC scenario, SN 103 may be a ng-eNB. In yet another embodiment of the present application, in the NR-DC scenario or the NGEN-DC scenario, SN 103 may be a gNB.

SN 103 may be associated with a secondary cell group (SCG). The SCG may refer to a group of serving cells associated with SN 103, and may include a primary secondary cell (PSCell) and optionally one or more secondary cells (SCells). The PCell of the MCG and the PSCell of the SCG may also be referred to as a special cell (SpCell).

In some embodiments of the present application, UE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. In some other embodiments of the present application, UE 101 may include a portable wireless communication device, a smart phone, a cellular telephone, a flip phone, a device having a subscriber identity module, a personal computer, a selective call receiving circuitry, or any other device that is capable of sending and receiving communication signals on a wireless network. In some other embodiments of the present application, UE 101 may include wearable devices, such as smart watches, fitness bands, optical head-mounted displays, or the like. Moreover, UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

Currently, agreements of 3GPP standard documents regarding a SCell activation procedure or a SCell deactivation procedure are as follows. To enable reasonable UE battery consumption when carrier aggregation (CA) is configured, an activation/deactivation mechanism of Cells is supported. When a SCell is deactivated, a UE does not need to receive the corresponding physical downlink control channel (PDCCH) or physical downlink shared channel (PDSCH), cannot transmit in the corresponding uplink, nor is it required to perform channel quality indicator (CQI) measurements. Conversely, when a SCell is active, the UE shall receive PDSCH and PDCCH (if the UE is configured to monitor PDCCH from this SCell) and is expected to be able to perform CQI measurements. NG-RAN ensures that while PUCCH SCell (a Secondary Cell configured with PUCCH) is deactivated, SCells of secondary PUCCH group (a group of SCells whose PUCCH signaling is associated with the PUCCH on the PUCCH SCell) should not be activated. NG-RAN ensures that SCells mapped to PUCCH SCell are deactivated before the PUCCH SCell is changed or removed.

In general, a SCG activation procedure can be initiated by a MN, a SN, or a UE. On the other hand, the exact mechanism to support a MN initiated SCG activation procedure, a SN initiated SCG activation procedure, or a UE initiated SCG activation procedure is unclear. Specific mechanisms are needed to activate a SCG in an efficient way.

Some embodiments of the present application provide a SCG deactivation mechanism in a MR-DC scenario in 3GPP 5G NR system or the like. Some embodiments of the present application provide a SCG activation mechanism in a MR-DC scenario in 3GPP 5G NR system or the like. More details will be illustrated in the following text in combination with the appended drawings.

Figure 2:
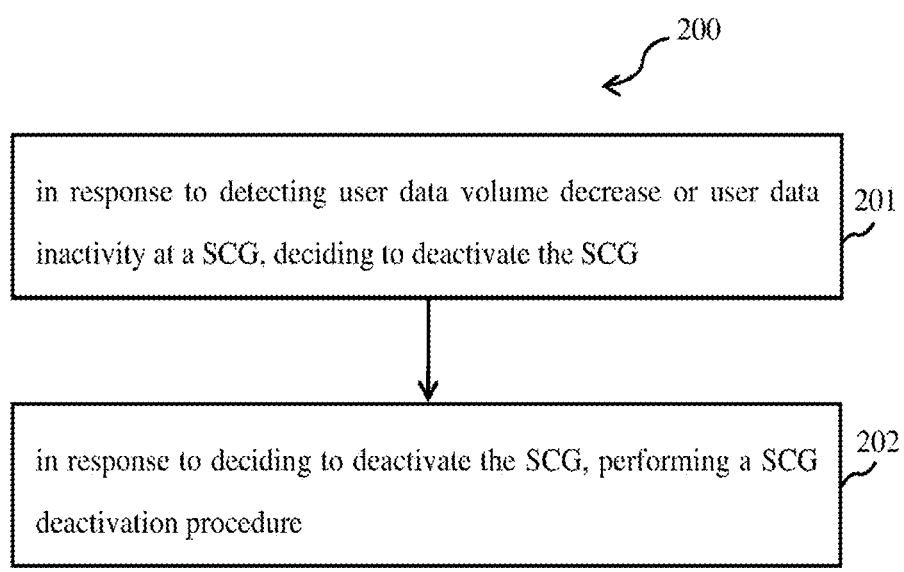
FIG. 2 illustrates a flow chart of a method for performing a SCG deactivation procedure in accordance with some embodiments of the present application.

FIG. 2 illustrates a flow chart of a method for performing a SCG deactivation procedure in accordance with some embodiments of the present application. The exemplary method 200 in the embodiments of FIG. 2 may be performed by:
  a UE (e.g., UE 101, UE 310, UE 410, or UE 510, as shown and illustrated in any of FIGS. 1 and 3-5); or
  a MN (e.g., MN 102, MN 320, MN 420, or MN 520, as shown and illustrated in any of FIGS. 1 and 3-5); or
  a SN (e.g., SN 103, SN 330, SN 430, or SN 530 as shown and illustrated in any of FIGS. 1 and 3-5).

Although described with respect to a UE, a MN, or a SN, it should be understood that other devices may be configured to perform a method similar to that of FIG. 2.

The embodiments of FIG. 2 assume that a MN and a SN may be combined in any one of EN-DC, NGEN-DC, NE-DC, and NR-DC scenarios. Following definitions are assumed in the embodiments of FIG. 2:

Fast MCG link recovery: in a MR-DC scenario, an RRC procedure where the UE sends an MCG Failure Information message to the MN via the SCG upon the detection of a radio link failure on the MCG.

Master Cell Group: in a MR-DC scenario, a group of serving cells associated with the Master Node, comprising of the SpCell (PCell) and optionally one or more SCells.

Secondary Cell Group: in a MR-DC scenario, a group of serving cells associated with the Secondary Node, comprising of the SpCell (PSCell) and optionally one or more SCells.

Secondary node: in a MR-DC scenario, the radio access node, with no control plane connection to the core network, providing additional resources to the UE. It may be an en-gNB (in EN-DC), a Secondary ng-eNB (in NE-DC) or a Secondary gNB (in NR-DC and NGEN-DC).

SCG bearer: in a MR-DC scenario, a radio bearer with an RLC bearer (or two RLC bearers, in case of CA packet duplication in an E-UTRAN cell group, or up to four RLC bearers in case of CA packet duplication in a NR cell group) only in the SCG.

SpCell: a primary cell of a master or secondary cell group.

signaling radio bearer (SRB) 3: in EN-DC, NGEN-DC and NR-DC, a direct SRB between the SN and the UE.

Split bearer: in a MR-DC scenario, a radio bearer with RLC bearers both in MCG and SCG.

In the exemplary method 200 as shown in FIG. 2, in operation 201, in response to detecting user data volume decrease or user data inactivity at a SCG, one of a UE, a MN, and a SN (e.g., UE 101, MN 102, or SN 103 as shown and illustrated in FIG. 1) may decide to deactivate the SCG.

According to some embodiments of the present application, in response to receiving a secondary radio access technology (RAT) data usage report from a secondary node (SN), the user data volume decrease is detected. Then, the UE, the MN, or the SN may decide to deactivate the SCG.

According to some other embodiments of the present application, the user data inactivity at the SCG is detected in response to:

(1) receiving an activity notification from a SN;
(2) no uplink transmission and no downlink transmission at the SCG; and/or
(3) an expiry of an inactivity timer.

In an embodiment, if an inactivity timer expires and if a SCG deactivation procedure is completed, the UE transmits, to a MN, information associated with the SCG. In a further embodiment, if an inactivity timer expires and if a SCG deactivation procedure is completed, the SN transmits, to a MN, information associated with the UE.

In an embodiment, the UE, the MN, or the SN receives configuration information regarding an inactivity timer. Then, if a transmission occurs on an uplink or a downlink, the UE, the MN, or the SN may (re-)start the inactivity timer.

In particular, a SCG can be deactivated in the following exemplary scenarios:

(1) A MN deduces the user data inactivity (i.e., no UL and DL traffic) at a SCG from an activity notification sent by a SN. Then, the MN decides to deactivate the SCG.
(2) A MN deduces the user data volume decrease from a secondary RAT data usage report sent by a SN. Then, the MN decides to switch the SCG radio bearer to a MCG and deactivate the SCG.
(3) A SN detects the user data inactivity (i.e., no UL and DL traffic) at SCG. Then, the SN decides to deactivate the SCG.
(4) A UE detects the user data inactivity (i.e., no UL and DL traffic) at a SCG. Then, the UE decides to deactivate the SCG.

Referring back to FIG. 2, in response to deciding to deactivate the SCG as illustrated in operation 201, the UE, the MN, or the SN may perform a SCG deactivation procedure in operation 202.

A SCG deactivation procedure performed by a UE may be named as a UE initiated SCG deactivation procedure. A SCG deactivation procedure performed by a MN may be named as a MN initiated SCG deactivation procedure. A SCG deactivation procedure performed by a SN may be named as a SN initiated SCG deactivation procedure.

In some embodiments, during performing the SCG deactivation procedure, SCG deactivation indication information may be sent.

In an example, during performing a MN initiated deactivation procedure, the MN sends the SCG deactivation indication information to a UE, and the SCG deactivation indication information includes an indicator associated with the SCG.

In a further example, during performing a MN initiated deactivation procedure, the MN sends the SCG deactivation indication information to a SN, and the SCG deactivation indication information includes an indicator associated with a UE. For instance, the indicator associated with the UE is an inactive radio network temporary identifier (I-RNTI).

In another example, during performing a SN initiated deactivation procedure, the SN sends the SCG deactivation indication information to a UE, and the SCG deactivation indication information includes an indicator associated with a PSCell.

In yet another example, during performing a SN initiated deactivation procedure, the SN sends the SCG deactivation indication information to a MN, and the SCG deactivation indication information includes an indicator associated with a UE. For instance, the indicator associated with the UE is an I-RNTI.

According to some embodiments, the SCG deactivation indication information may be carried by one of:

(1) a SCG deactivation message;
(2) a RRC message;
(3) a medium access control (MAC) control element (CE); and
(4) downlink control information (DCI) signaling.

According to some embodiments, after performing the SCG deactivation procedure, a UE maintains configuration context of the SCG. The UE also stops any uplink transmission, any downlink transmission, any uplink reception, and any downlink reception in the SCG.

According to some embodiments, after performing the SCG deactivation procedure, a UE flushes a buffer of the UE and resets one or more variables in each protocol stack of the UE. The UE also stores a dedicated identifier of the UE. For instance, the UE stores the current cell radio network temporary identifier (C-RNTI).

Details described in all other embodiments of the present application (for example, details of a SCG deactivation mechanism in a MR-DC scenario) are applicable for the embodiments of FIG. 2. Moreover, details described in the embodiments of FIG. 2 are applicable for all the embodiments of FIGS. 1 and 3-11.

Figure 3:
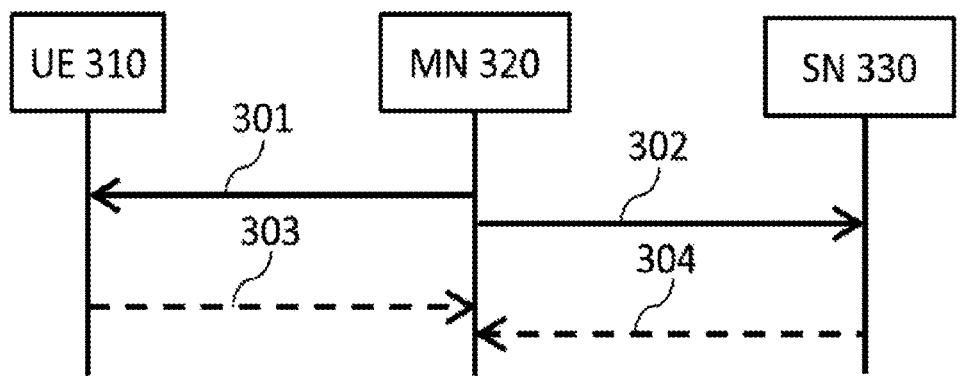
FIG. 3 illustrates an exemplary flowchart of a UE initiated SCG deactivation procedure in accordance with some embodiments of the present application.

FIG. 3 illustrates an exemplary flowchart of a UE initiated SCG deactivation procedure in accordance with some embodiments of the present application.

As shown in FIG. 3, in operation 301, MN 320 (e.g., MN 102 as illustrated and shown in FIG. 1) transmits configuration information regarding an inactivity timer to UE 310 (e.g., UE 101 as illustrated and shown in FIG. 1). In operation 302, MN 320 transmits the same configuration information regarding the inactivity timer to SN 330 (e.g., SN 103 as illustrated and shown in FIG. 1). The operations 301 and 302 may be performed simultaneously. The operation 301 may be performed prior to or after the operation 302.

According to some embodiments, the inactivity timer can be configured by MN 320 to UE 310 via a RRC message. MN 320 may configure the same inactivity timer to SN 330 via a RRC message, e.g., over Xn interface, and the RRC message includes information of UE 310 (e.g., an identifier (ID) of UE 310).

The inactivity timer configured to UE 310 or SN 330 may be started or restarted when any transmission happens on an uplink or a downlink. According to some embodiments, the inactivity timer is started or restarted when any of the following conditions happens:
  (1) if PDCCH on the activated SCG indicates an uplink grant or downlink assignment; or
  (2) if PDCCH on the Serving cell scheduling the activated SCG indicates an uplink grant or a downlink assignment for the activated SCell; or
  (3) if a MAC packet data unit (PDU) is transmitted in a configured uplink grant and LBT failure indication is not received from lower layers; or
  (4) if a MAC PDU is received in a configured downlink assignment; or
  (5) no UL DL service data and no DL service data is available in the UE buffer.

In some embodiments, upon the inactivity timer expiry, the SCG is deactivated. Then, MN 320 may be informed about the deactivated state of the SCG. For example, in operation 303, if the inactivity timer configured for UE 310 expiries, UE 310 transmits deactivated state information regarding the SCG. In operation 304, if the inactivity timer configured for SN 330 expiries, SN 330 transmits deactivated state information regarding the SCG. The operation 301 or the operation 302 is optional, and thus both of them are marked as dotted lines as shown in FIG. 3.

In one embodiment, upon performing the SCG deactivation procedure or after completing the SCG deactivation procedure, UE 310 informs MN 320 via RRC signaling, e.g., over Uu interface. The RRC signaling may include information of the SCG (e.g., an ID of the SCG).

In another embodiment, upon performing the SCG deactivation procedure or after completing the SCG deactivation procedure, SN 330 informs MN 320 via a RRC message, e.g., over Xn interface. The RRC message may include information of the UE (e.g., an ID of UE 310).

In some embodiments, if the SCG is deactivated upon an expiry of the inactivity timer, UE 310 may maintain the SCG configuration context (which includes the SCG radio bear configuration), while UE 310 may stop any uplink and downlink transmission/reception in the SCG. UE 310 may also flush all buffer(s) and reset variable(s) in each protocol stack. UE 310 may also store its current dedicated ID. For instance, UE 310 may store its current C-RNTI.

In some embodiments, if SRB3 is configured at SN 330 and MN 320 is not involved in the network architecture, SN 330 may configure such inactivity timer directly to UE 310 via a RRC message sent from SRB3.

Details described in all other embodiments of the present application (for example, details of a SCG deactivation mechanism in a MR-DC scenario) are applicable for the embodiments of FIG. 3. Moreover, details described in the embodiments of FIG. 3 are applicable for all the embodiments of FIGS. 1, 2, and 4-11.

Figure 4:
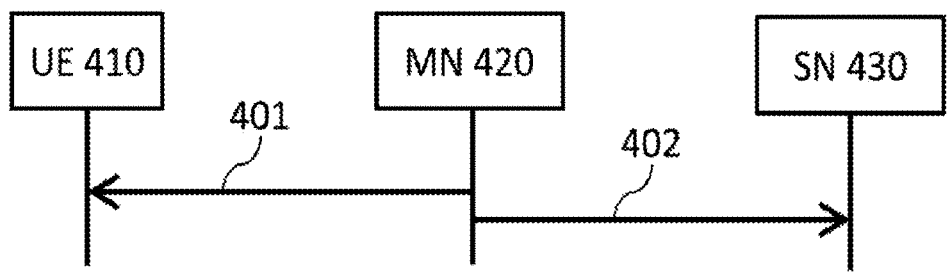
FIG. 4 illustrates an exemplary flowchart of a MN initiated SCG deactivation procedure in accordance with some embodiments of the present application.

FIG. 4 illustrates an exemplary flowchart of a MN initiated SCG deactivation procedure in accordance with some embodiments of the present application.

In the embodiments of FIG. 4, MN 420 (e.g., MN 102 as illustrated and shown in FIG. 1) initiates a SCG deactivation procedure by sending SCG deactivation indication information (e.g., a SCG deactivation message) to at least one of UE 410 (e.g., UE 101 as illustrated and shown in FIG. 1) and SN 430 (e.g., SN 103 as illustrated and shown in FIG. 1).

As shown in FIG. 4, in operation 401, MN 420 transmits SCG deactivation indication information to UE 410. In operation 402, MN 420 transmits the SCG the same deactivation indication information to SN 430.

In an embodiment, only the operation 401 is performed. In a further embodiment, only the operation 402 is performed. In another further embodiment, both the operations 401 and 402 are performed. The operations 401 and 402 may be performed simultaneously. The operation 401 may be performed prior to or after the operation 402.

In some embodiments, the SCG deactivation indication information sent from MN 420 to UE 410 in operation 401 includes an indicator associated with the SCG or PSCell. It can be either a RRC message or a MAC CE or DCI signaling. In some embodiments, the SCG deactivation indication information sent from MN 420 to SN 430 in operation 402 includes an indicator associated with the corresponding UE (e.g., an I-RNTI).

In some embodiments, when the SCG is deactivated, UE 410 may maintain the SCG configuration context (including the SCG radio bear configuration), stop any uplink transmission or reception in the SCG, and stop any downlink transmission or reception in the SCG. UE 410 may also flush all buffer(s) and reset the variable(s) in each protocol stack. UE 410 may also store its current C-RNTI.

Details described in all other embodiments of the present application (for example, details of a SCG deactivation mechanism in a MR-DC scenario) are applicable for the embodiments of FIG. 4. Moreover, details described in the embodiments of FIG. 4 are applicable for all the embodiments of FIGS. 1-3 and 5-11.

Figure 5:
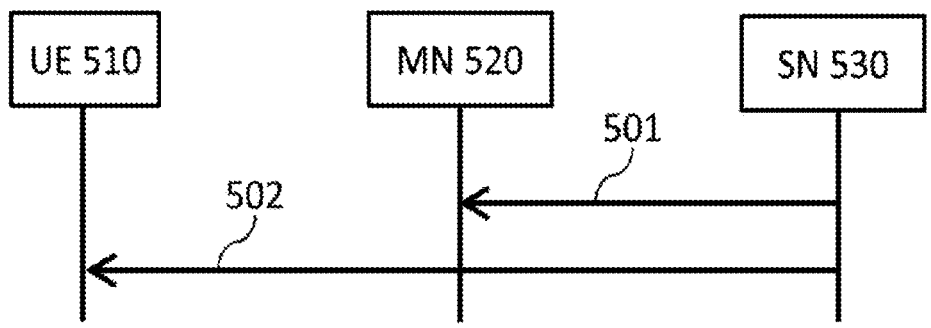
FIG. 5 illustrates an exemplary flowchart of a SN initiated SCG deactivation procedure in accordance with some embodiments of the present application.

FIG. 5 illustrates an exemplary flowchart of a SN initiated SCG deactivation procedure in accordance with some embodiments of the present application.

In the embodiments of FIG. 5, SN 530 (e.g., SN 103 as illustrated and shown in FIG. 1) initiates a SCG deactivation procedure by sending SCG deactivation indication information (e.g., a SCG deactivation message) to at least one of MN 520 (e.g., MN 102 as illustrated and shown in FIG. 1) and UE 510 (e.g., UE 101 as illustrated and shown in FIG. 1).

As shown in FIG. 5, in operation 501, SN 530 transmits SCG deactivation indication information to MN 520. In operation 502, SN 530 transmits the SCG deactivation indication information to UE 510.

In an embodiment, only the operation 501 is performed. In a further embodiment, only the operation 502 is performed. In another further embodiment, both the operations 501 and 502 are performed. The operations 501 and 502 may be performed simultaneously. The operation 501 may be performed prior to or after the operation 502.

In some embodiments, the SCG deactivation indication information sent from SN 530 to MN 520 in operation 501 includes an indicator associated with the corresponding UE (e.g., an I-RNTI). Then, MN 520 may inform UE 510 about the SCG deactivation indication information by any of the following manners:

1) forwarding the same SCG deactivation indication information (e.g., a SCG deactivation message) to UE 510 via a RRC message, without modifying the SCG deactivation indication information; or
2) generating a new RRC message based on the received SCG deactivation indication information, and sending the generated new RRC message to UE 510; or
3) generating a MAC CE based on the received SCG deactivation indication information, and sending the generated MAC CE to UE 510; or
4) generating DCI signaling based on the received SCG deactivation indication information, and sending the generated DCI signaling to UE 510.

In some embodiments, SN 530 directly sends the SCG deactivation indication information to UE 510 via any of the following manners:
1) sending a MAC CE (which carries the SCG deactivation indication information) to UE 510; or
2) sending DCI signaling (which carries the SCG deactivation indication information) to UE 510; or
3) sending a RRC message (which carries the SCG deactivation indication information) to UE 510 when SRB3 is configured.

In some embodiments, when the SCG is deactivated, UE 510 may maintain the SCG configuration context (including the SCG radio bear configuration), stop any uplink transmission or reception in the SCG, and stop any downlink transmission or reception in the SCG. UE 510 may also flush all buffer(s) and reset the variable(s) in each protocol stack. UE 510 may also store its current C-RNTI.

Details described in all other embodiments of the present application (for example, details of a SCG deactivation mechanism in a MR-DC scenario) are applicable for the embodiments of FIG. 5. Moreover, details described in the embodiments of FIG. 5 are applicable for all the embodiments of FIGS. 1-4 and 6-11.

Figure 6:
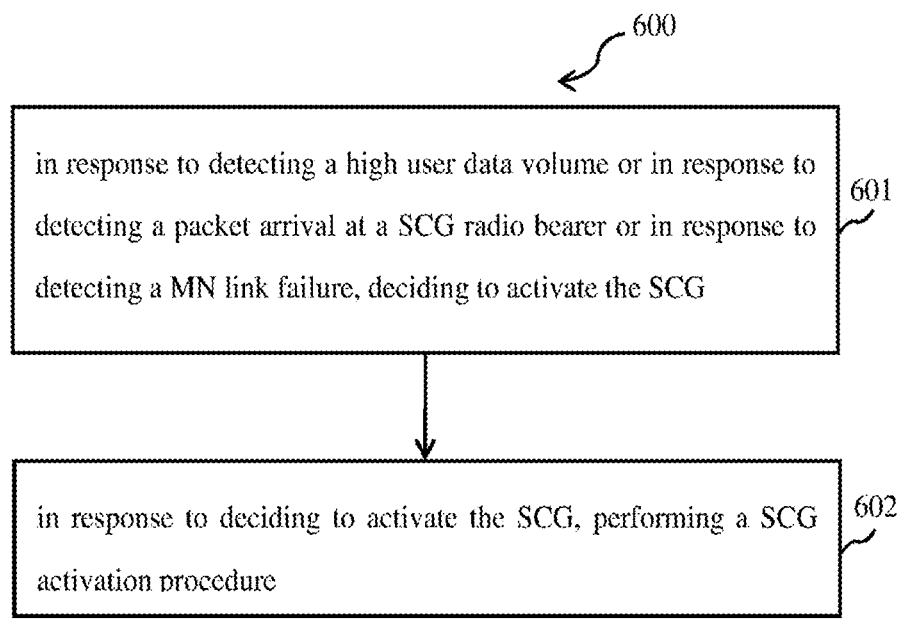
FIG. 6 illustrates a flow chart of a method for performing a SCG activation procedure in accordance with some embodiments of the present application.

FIG. 6 illustrates a flow chart of a method for performing a SCG activation procedure in accordance with some embodiments of the present application. The exemplary method 600 may be performed by:
a UE (e.g., UE 101, UE 710, UE 810, UE 910, or UE 1010, as shown and illustrated in any of FIGS. 1 and 7-10); or
a MN (e.g., MN 102, MN 720, MN 820, MN 920, or MN 1020, as shown and illustrated in any of FIGS. 1 and 7-10); or
a SN (e.g., SN 103, SN 730, SN 830, SN 930, or SN 1030 as shown and illustrated in any of FIGS. 1 and 7-10).

Although described with respect to a UE, a MN, or a SN, it should be understood that other devices may be configured to perform a method similar to that of FIG. 6. The embodiments of FIG. 6 assume that a MN and a SN may be combined in any one of EN-DC, NGEN-DC, NE-DC, and NR-DC scenarios.

In the exemplary method 600 as shown in FIG. 6, in operation 601, in response to detecting a high user data volume or in response to detecting a packet arrival at a SCG radio bearer or in response to detecting a MN link failure, one of a UE, a MN, and a SN (e.g., UE 101, MN 102, or SN 103 as shown and illustrated in FIG. 1) may decide to activate the SCG.

In an embodiment, a MN detects a downlink transmission packet arrival at the SCG radio bearer, and then, the MN decides to activate the SCG. In a further embodiment, a SN detects a downlink transmission packet arrival at the SCG radio bearer, and then, the SN decides to activate the SCG.

In another embodiment, a UE detects an uplink transmission packet arrival at the SCG radio bearer, and then, the UE decides to activate the SCG.

Referring back to FIG. 6, in operation 602, in response to deciding to activate the SCG, the UE, the MN, or the SN performs a SCG activation procedure.

According to some embodiments, the UE, the MN, or the SN transmits SCG activation request information (e.g., a SCG activation request message) and receives SCG activation acknowledge information (e.g., a SCG activation acknowledge (ACK) message). Specific examples are described in FIGS. 7-10.

According to some embodiments, the UE, the MN, or the SN further receives SCG activation trigger information (e.g., a SCG activation trigger message). For instance, the SCG activation trigger information includes at least one of: a SCG activation reason, and a SCG measurement report.

According to some embodiments, SCG activation indication information is further transmitted, e.g., by the MN. In one example, the SCG activation indication information includes at least one of SCG radio bearer configuration and random access related configuration. In another example, the SCG activation indication information is carried by one of: a SCG activation indication message; a RRC message; and a MAC CE.

According to some embodiments, a random access message is further received, e.g., by the SN. In one example, if the SN receives the random access message from a UE, the SN transmits SCG activation request information to a MN. In another example, the SN transmits a random access response message, e.g., to the UE. For instance, the SN transmits the random access response message after the SN receives the SCG activation acknowledge information.

In some embodiments, the SCG activation request information includes at least one of:
a SCG activation reason;
an ID of a UE;
a quality of service (QoS) flow offloading configuration;
a SCG measurement report;
SCG radio bearer configuration; and
random access related configuration.

In some embodiments, the SCG activation acknowledge information includes at least one of:
SCG radio bearer configuration;
random access related configuration;
a SCG measurement report; and
a QoS flow offloading configuration.

In particular, a SCG activation procedure can also be initiated by a MN, a SN, or a UE in the following exemplary cases:
(1) A MN faces a high user data volume at a MCG and the MN would like to offload some QoS traffic. Then, the MN decides to activate the SCG.
(2) A MN faces a high user data volume at a MCG and the MN would like to reuse the SCG leg of a split bearer. Then, the MN decides to activate the SCG.
(3) A SN detects a packet arrival at a SCG radio bearer for a downlink transmission. Then, the SN decides to activate the SCG.
(4) A UE detects a packet arrival at a SCG radio bearer for an uplink transmission. Then, the UE decides to activate the SCG.

A SCG activation procedure performed by a UE may be named as a UE initiated SCG activation procedure. A SCG activation procedure performed by a MN may be named as a MN initiated SCG activation procedure. A SCG activation procedure performed by a SN may be named as a SN initiated SCG activation procedure.

In some embodiments, after performing a SCG deactivation procedure, the MN performs at least one of following behaviors:
(1) starting to forward split bearer data to a SN;
(2) offloading a QoS traffic of the MN to the SN;
(3) switching a radio bearer to the SN after receiving SCG activation acknowledge information; and
(4) reusing a leg of the SCG of a split bearer. For instance, the split bearer can be terminated at the MN or the SN.

In some embodiments, after performing a SCG deactivation procedure, the UE performs at least one of following behaviors:
(1) in response to a time alignment between a UE and a SN, the UE transmits a packet to the SCG without performing a random access procedure;
(2) in response to the time misalignment between the UE and the SN, the UE starts a random access procedure towards the SN; and
(3) in response to assigning no dedicated ID of the UE, the UE uses a saved dedicated ID of the UE (e.g., C-RNTI), to communicate with the SN.

Details described in all other embodiments of the present application (for example, details of a SCG activation mechanism in a MR-DC scenario) are applicable for the embodiments of FIG. 6. Moreover, details described in the embodiments of FIG. 6 are applicable for all the embodiments of FIGS. 1-5 and 7-11.

Figure 7:
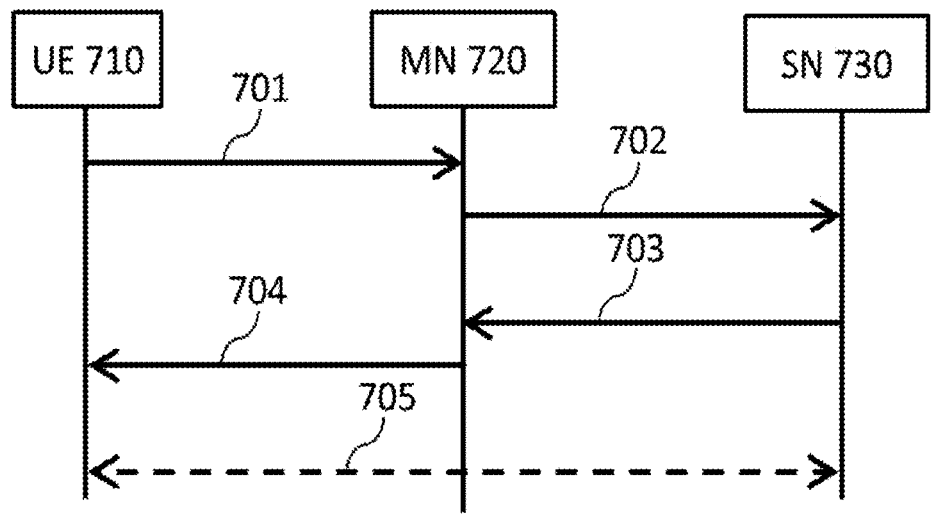
FIG. 7 illustrates an exemplary flowchart of a UE initiated SCG activation procedure in accordance with some embodiments of the present application.

FIG. 7 illustrates an exemplary flowchart of a UE initiated SCG activation procedure in accordance with some embodiments of the present application.

In the embodiments of FIG. 7, in response to detecting a MN link failure and if UE 710 (e.g., UE 101 as illustrated and shown in FIG. 1) is configured to send a failure report via SN 730 (e.g., SN 103 as illustrated and shown in FIG. 1), UE 710 initiates a SCG activation procedure.

In some embodiments, UE 710 initiates a SCG activation procedure via an explicit request sent to MN 720 (e.g., MN 102 as illustrated and shown in FIG. 1), for example, due to an UL data arrival at a SCG radio bearer or in case of a fast MCG link recovery procedure. SN 730 (e.g., SN 103 as illustrated and shown in FIG. 1) may confirm with MN 720, before SN 730 responds to a random access request from UE 710.

As shown in FIG. 7, in operation 701, if the link between MN 720 and UE 710 is still available, UE 710 generates SCG activation trigger information (e.g., a SCG activation trigger message, a RRC message, or a MAC CE) and sends the SCG activation trigger information to MN 720. Such SCG activation trigger information may include at least one of: a SCG activation reason; and a SCG measurement report (e.g., a radio resource management (RRM) measurement).

In operation 702, MN 720 sends SCG activation request information (e.g., a SCG activation request message) to SN 730. Such SCG activation request information may include at least one of: a SCG activation reason, an ID of UE 710 (e.g., I-RNTI-VALUE), QoS flow offloading configuration, and a SCG measurement report (e.g., a RRM measurement).

Such SCG activation request information could be carried in a RRC message sent over X2 or Xn interface. Such SCG activation request information can be carried in a dedicated message or an existing message with a new field. For instance, such SCG activation request information may be carried in a dedicated new message (e.g., a SCG activation request message) defined in a 3GPP standard document. Alternatively, such SCG activation request information may be carried in a predefined message (e.g., a SN Modification Request message) of a legacy SN modification procedure as specified in 3GPP standard document TS37.340, and the predefined message includes a field regarding the SCG activation request information.

In operation 703, after SN 730 accepts the SCG activation request information, SN 730 may transmit SCG activation acknowledge information (e.g., a MN activation acknowledge message) to MN 720. Such SCG activation acknowledge information may include at least one of: SCG radio bearer configuration; and random access related configuration (e.g., a preamble). Such SCG activation acknowledge information could be carried in a RRC message sent over X2 or Xn interface.

In operation 704, MN 720 generates SCG activation indication information and sends the SCG activation indication information to UE 710. The SCG activation indication information may be sent via a dedicated RRC signaling or via a MAC CE. Such SCG activation indication information may contain the information which is received by MN 720 from SN 730. For example, the SCG activation indication information includes at least one of: SCG radio bearer configuration; and random access related configuration (e.g., a preamble).

In operation 705, if UE 710 and SN 730 are not time aligned anymore (e.g., a time alignment timer (TAT) expiries), UE 710 starts a random access procedure towards SN 730. If UE 710 and SN 730 are still time aligned (e.g., the TAT is still running), UE 710 can directly send packet(s) to the SCG without performing a random access procedure. The operation 705 is optional.

According to some embodiments, MN 720 may start to forward split bearer data to SN 730, offload a QoS flow to SN 730, or switch a radio bearer to SN 730 at any time after SN 730 transmits SCG activation acknowledge information after receiving the SCG activation request information.

According to some other embodiments, UE 710 may continue to use its previously saved C-RNTI to communication with SN 730, unless SN 730 assigns a new C-RNTI to UE 710.

Details described in all other embodiments of the present application (for example, details of a SCG activation mechanism in a MR-DC scenario) are applicable for the embodiments of FIG. 7. Moreover, details described in the embodiments of FIG. 7 are applicable for all the embodiments of FIGS. 1-6 and 8-11.

Figure 8:
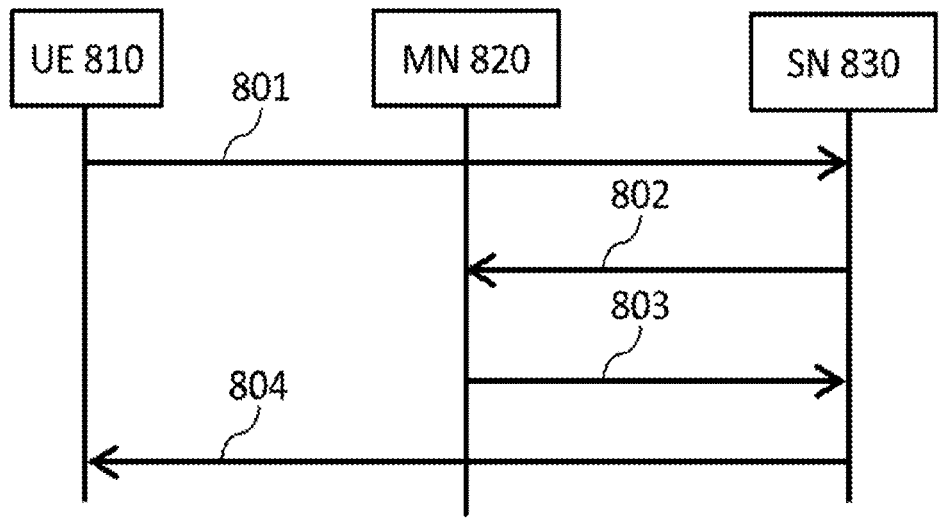
FIG. 8 illustrates a further exemplary flowchart of a UE initiated SCG activation procedure in accordance with some embodiments of the present application.

FIG. 8 illustrates a further exemplary flowchart of a UE initiated SCG activation procedure in accordance with some embodiments of the present application.

In the embodiments of FIG. 8, UE 810 (e.g., UE 101 as illustrated and shown in FIG. 1) initiates a SCG activation procedure via a random access procedure towards SN 830 (e.g., SN 103 as illustrated and shown in FIG. 1), for example, due to an UL data arrival at a SCG radio bearer or in a case of a fast MCG link recovery procedure. SN 830 may confirm with MN 820 (e.g., MN 102 as illustrated and shown in FIG. 1) before responding to a random access request from UE 810.

As shown in FIG. 8, in operation 801, if UE 810 and SN 830 is not time aligned anymore (e.g., a TAT expiries), UE 810 initiates or trigger the SCG activation procedure by transmitting a random access request to SN 830. The random access message sent to SN 830 may include an ID of UE 810 (e.g., I-RNTI). If UE 810 and SN 830 are still time aligned (e.g., a TAT is still running), UE 810 can directly send a RRC message or a MAC CE to SN 830, to initiate or trigger the SCG activation procedure.

In operation 802, after receiving, from UE 810, the random access request message (which contains information regarding UE 810) and after completing a random access procedure, SN 830 generates SCG activation request information (e.g., a SCG activation request message) and sends the SCG activation request information to MN 820.

Such SCG activation request information may include, such as, an ID of UE 810 (e.g., I-RNTI-VALUE) and/or a SCG activation reason. For example, the SCG activation reason indicates that "UE 810 is triggered," to distinguish from a SN initiated SCG activation procedure. Such SCG activation request information could be carried in a RRC message sent over X2 or Xn interface. Such SCG activation request information can be carried in a dedicated message or an existing message with a new field or indicator. For instance, such SCG activation request information may be carried in a dedicated new message (e.g., a SCG activation request message) defined in a 3GPP standard document. Alternatively, such SCG activation request information may be carried in a SN Modification Request message as specified in 3GPP standard document TS37.340, and the SN Modification Request message includes a field regarding the SCG activation request information.

In operation 803, after MN 820 accepts the SCG activation request information, MN 820 transmits SCG activation acknowledge information (e.g., a SCG activation acknowledge message) to SN 830. Such SCG activation acknowledge information may include, such as, QoS flow offloading configuration and/or a SCG measurement report (e.g., a RRM measurement). Such SCG activation acknowledge information could be carried in a RRC message sent over X2 or Xn interface.

In operation 804, SN 830 sends a random access response to UE 810 and continues rest step(s) of the random access procedure.

According to some embodiments, MN 820 may start to forward a split bearer data to SN 830, offload a QoS flow to SN 830, or switch a radio bearer to SN 830 at any time after MN 820 transmits SCG activation acknowledge information in operation 803.

According to some other embodiments, UE 810 may continue to use its previously saved C-RNTI to communication with SN 830, unless SN 830 assigns a new C-RNTI to UE 810.

The UE initiated SCG activation procedure in the embodiments of FIG. 8 can be used to facilitate a fast MCG recovery procedure. In a case that a connection between UE 810 and MN 820 fails and a fast MCG recovery procedure is configured, UE 810 shall send a MCG failure information message to SN 830, and SN 830 may forward the MCG failure information message to MN 820. If the SCG is deactivated at that time, UE 810 shall firstly get access to SN 830 via the UE initiated SCG activation procedure as described in the embodiments of FIG. 8.

Details described in all other embodiments of the present application (for example, details of a SCG activation mechanism in a MR-DC scenario) are applicable for the embodiments of FIG. 8. Moreover, details described in the embodiments of FIG. 8 are applicable for all the embodiments of FIGS. 1-7 and 9-11.

Figure 9:
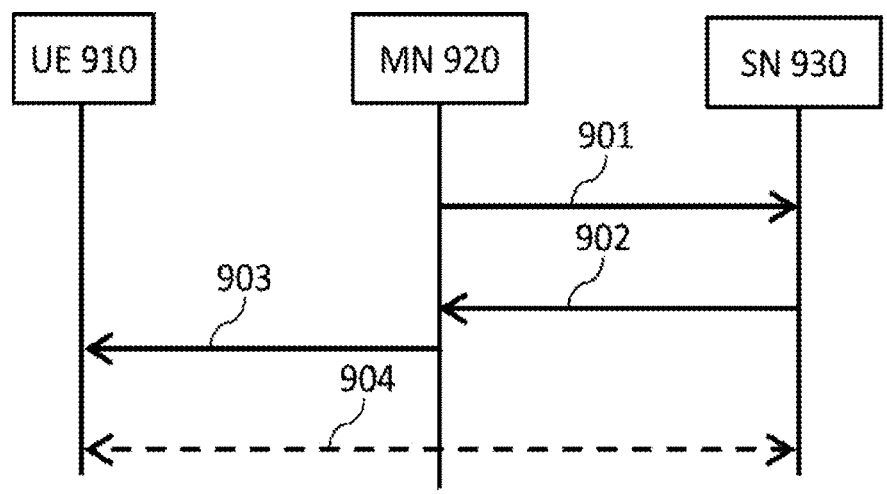
FIG. 9 illustrates an exemplary flowchart of a MN initiated SCG activation procedure in accordance with some embodiments of the present application.

FIG. 9 illustrates an exemplary flowchart of a MN initiated SCG activation procedure in accordance with some embodiments of the present application.

In the embodiments of FIG. 9, a SCG activation procedure is initiated by MN 920 (e.g., MN 102 as illustrated and shown in FIG. 1), for example, due to a radio bearer switching or QoS flow offloading. UE 910 may start a random access procedure towards SN 930, once UE 910 receives an explicit signaling from MN 920 to activate SN 930.

As shown in FIG. 9, in operation 901, MN 920 initiates a SCG activation procedure by sending SCG activation request information (e.g., a SCG activation request message) to SN 930. Such SCG activation request information may include, such as, a SCG activation reason, an ID of UE 910 (e.g., I-RNTI-VALUE), QoS flow offloading configuration, and/or a SCG measurement report (e.g., a RRM measurement).

Such SCG activation request information could be carried in a RRC message sent over X2 or Xn interface. Such SCG activation request information can be carried in a dedicated new message (e.g., a SCG activation request message defined in a 3GPP standard document). Such SCG activation request information can be carried in an existing message (e.g., a SN Modification Request message as specified in 3GPP standard document TS37.340) including a field regarding the SCG activation request information.

In operation 902, after SN 930 accepts the SCG activation request information, SN 930 transmits SCG activation acknowledge information (e.g., a SCG activation acknowledge message) to MN 920. Such SCG activation acknowledge information may include, such as, SCG radio bearer configuration and/or random access related configuration (e.g., a preamble). Such SCG activation acknowledge information could be carried in a RRC message sent over X2 or Xn interface.

In operation 903, MN 920 generates SCG activation indication information (e.g., a SCG activation message) and sends the SCG activation indication information to UE 910, e.g., via a dedicated RRC signaling or via a MAC CE. Such SCG activation indication information may contain the information receives by MN 920 from SN 930. For example, the SCG activation indication information contains SCG radio bearer configuration and/or random access related configuration (e.g., a preamble).

In operation 904, if UE 910 and SN 930 are not time aligned anymore (e.g., a TAT expiry), UE 910 may start a random access procedure towards SN 930. If UE 910 and SN 930 is still time aligned (e.g., a TAT is still running), UE 910 can directly send packet(s) to the SCG without performing the random access procedure. The operation 904 is optional.

According to some embodiments, MN 920 may start to forward split bearer data to SN 930 or offload a QoS flow to SN 930 at any time after SN 930 transmits the SCG activation acknowledge information in operation 902.

According to some embodiments, UE 910 may continue to use its previously saved C-RNTI to communication with SN 930, unless SN 930 assigns a new C-RNTI to UE 910.

Details described in all other embodiments of the present application (for example, details of a SCG activation mechanism in a MR-DC scenario) are applicable for the embodiments of FIG. 9. Moreover, details described in the embodiments of FIG. 9 are applicable for all the embodiments of FIGS. 1-8, 10, and 11.

Figure 10:
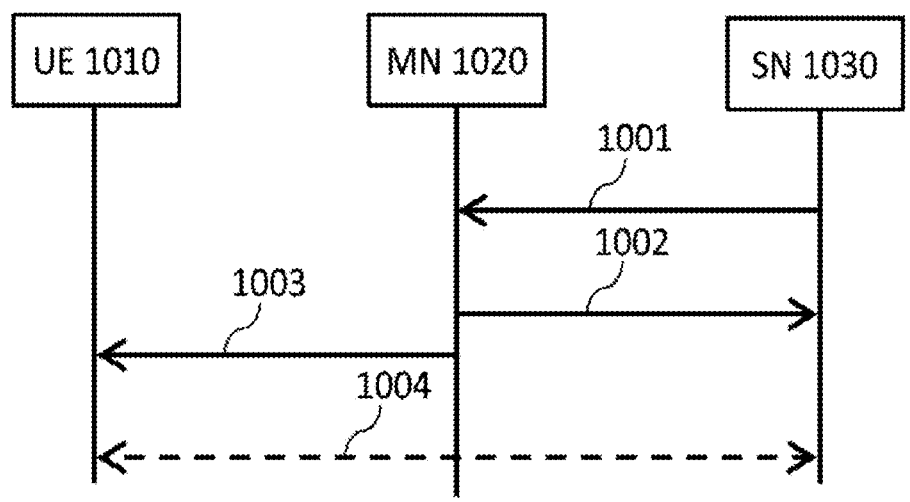
FIG. 10 illustrates an exemplary flowchart of a SN initiated SCG activation procedure in accordance with some embodiments of the present application.

FIG. 10 illustrates an exemplary flowchart of a SN initiated SCG activation procedure in accordance with some embodiments of the present application.

In the embodiments of FIG. 10, a SCG activation procedure is initiated by SN 1030 (e.g., SN 103 as illustrated and shown in FIG. 1), for example, due to a DL data arrival at a SCG radio bearer. UE 1010 (e.g., UE 101 as illustrated and shown in FIG. 1) may start a random access procedure towards SN 1030, once UE 1010 receives, from MN 1020

(e.g., MN 102 as illustrated and shown in FIG. 1), an explicit signaling to activate SN 1030.

As shown in FIG. 10, in operation 1001, SN 1030 initiates a SCG activation procedure by sending SCG activation request information (e.g., a SCG activation request message) to MN 1020. Such SCG activation request information may include, such as, an ID of UE 1010 (e.g., I-RNTI-VALUE), SCG radio bearer configuration, and/or random access related configuration (e.g., a preamble).

Such SCG activation request information could be carried in a RRC message sent over X2 or Xn interface. Such SCG activation request information can be carried in a dedicated new message (e.g., a SCG activation request message defined in a 3GPP standard document). Such SCG activation request information can be carried in an existing message (e.g., a SN Modification Request message as specified in 3GPP standard document TS37.340) including a field regarding the SCG activation request information.

In operation 1002, after MN 1020 accepts the SCG activation request information, MN 1020 transmits SCG activation acknowledge information (e.g., a SCG activation acknowledge message) to SN 1030. Such SCG activation acknowledge information may include, such as, QoS flow offloading configuration and/or a SCG measurement report (e.g., a RRM measurement). Such SCG activation acknowledge information could be carried in a RRC message sent over X2 or Xn interface.

In operation 1003, MN 1020 generates SCG activation indication information (e.g., a SCG activation message) and sends the SCG activation indication information to UE 1010, e.g., via RRC signaling or via a MAC CE. Such SCG activation indication information may contain the information which is received by MN 1020 from SN 1030, such as, SCG radio bearer configuration and/or random access related configuration (e.g., a preamble).

In operation 1004, if UE 1010 and SN 1030 are not time aligned anymore (e.g., a TAT expiries), UE 1010 may start a random access procedure towards SN 1030. If UE 1010 and SN 1030 are still time aligned (e.g., a TAT is still running), UE 1010 can directly send packet(s) to the SCG without performing a random access procedure. The operation 1004 is optional.

According to some embodiments, MN 1020 may starts to forward split bearer data to SN 1030 or offload a QoS flow to SN 1030 at any time after MN 1020 transmits the SCG activation acknowledge information in operation 1002.

According to some embodiments, UE 1010 may continue to use its previously saved C-RNTI to communication with SN 1030, unless SN 1030 assigns a new C-RNTI to UE 1010.

Details described in all other embodiments of the present application (for example, details of a SCG activation mechanism in a MR-DC scenario) are applicable for the embodiments of FIG. 10. Moreover, details described in the embodiments of FIG. 10 are applicable for all the embodiments of FIGS. 1-9 and 11.

Figure 11:
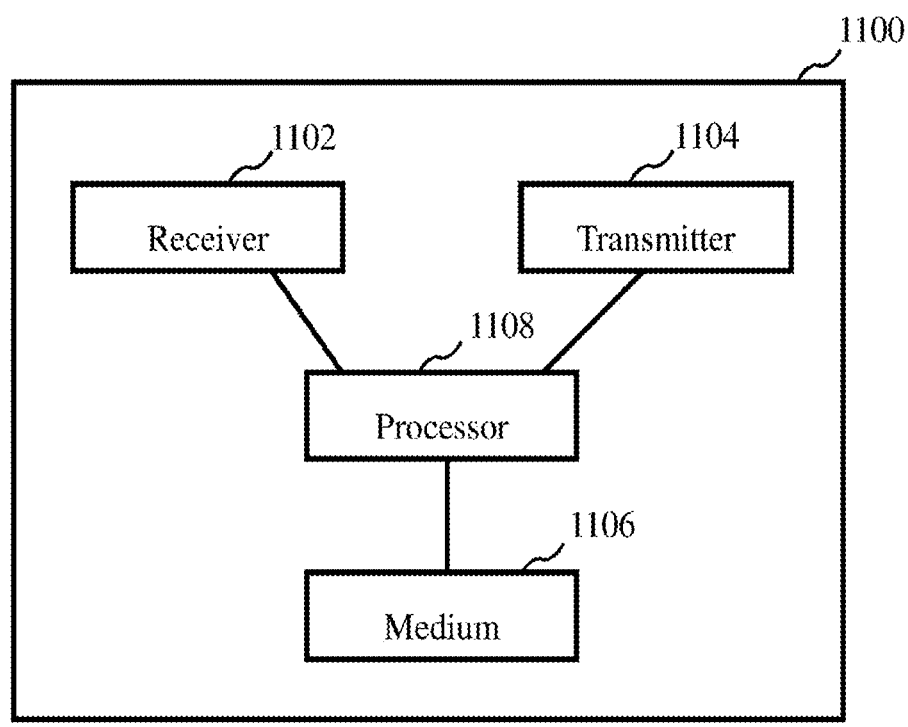
FIG. 11 illustrates an exemplary block diagram of an apparatus according to some embodiments of the present application.

FIG. 11 illustrates an exemplary block diagram of an apparatus according to some embodiments of the present application. In some embodiments of the present application, the apparatus 1100 may be a UE, a MN, or a SN, which can at least perform the method illustrated in any of FIGS. 2-10.

As shown in FIG. 11, the apparatus 1100 may include at least one receiver 1102, at least one transmitter 1104, at least one non-transitory computer-readable medium 1106, and at least one processor 1108 coupled to the at least one receiver 1102, the at least one transmitter 1104, and the at least one non-transitory computer-readable medium 1106.

Although in FIG. 11, elements such as the at least one receiver 1102, the at least one transmitter 1104, the at least one non-transitory computer-readable medium 1106, and the at least one processor 1108 are described in the singular, the plural is contemplated unless limitation to the singular is explicitly stated. In some embodiments of the present application, the at least one receiver 1102 and the at least one transmitter 1104 are combined into a single device, such as a transceiver. In certain embodiments of the present application, the apparatus 1100 may further include an input device, a memory, and/or other components.

In some embodiments of the present application, the at least one non-transitory computer-readable medium 1106 may have stored thereon computer-executable instructions which are programmed to implement the operations of the methods, for example as described in view of any of FIGS. 2-10, with the at least one receiver 1102, the at least one transmitter 1104, and the at least one processor 1108.

Those having ordinary skills in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. An apparatus for wireless communication, the apparatus comprising:
   at least one memory; and
   at least one processor coupled with the at least one memory and configured to cause the apparatus to:

receive configuration information regarding an inactivity timer;

start or restart the inactivity timer in response to an occurrence of an uplink transmission or a downlink transmission;

in response to a detected user data volume decrease or user data inactivity at a secondary cell group (SCG), after expiry of the inactivity timer, perform a SCG deactivation procedure to deactivate the SCG; and in response to the completion of the SCG deactivation procedure, and a time misalignment between a user equipment (UE) and a secondary node (SN), transmit a random access response to the UE, wherein a time misalignment occurs at a time alignment timer (TAT) expiry.

2. The apparatus of claim 1, wherein to perform the SCG deactivation procedure the at least one processor is configured to cause the apparatus to send SCG deactivation indication information.

3. The apparatus of claim 2, wherein:

the SCG deactivation indication information is sent from a master node (MN) to a secondary node (SN), or the SCG deactivation indication information is sent from the SN to the MN;

the SCG deactivation indication information includes an indicator associated with the UE; and the SCG deactivation indication information is carried by one of a SCG deactivation message, a RRC message, a medium access control (MAC) control element (CE), or downlink control information (DCI) signaling.

4. A method performed by a user equipment (UE), the method comprising:

in response to detecting at least one of a high user data volume, a packet arrival at a secondary cell group (SCG) radio bearer, or a master node (MN) link failure, determining to activate the SCG;

in response to determining to activate the SCG, performing a SCG activation procedure, the SCG activation procedure comprising transmitting SCG activation request information to a master node (MN), the SCG activation request information including a SCG activation reason; and in response to the completion of the SCG activation procedure, and a time alignment between the UE and a secondary node (SN), transmitting a packet to the SCG without performing a random access procedure, wherein a time alignment occurs when a time alignment timer (TAT) is running.

5. The method of claim 4, further comprising in response to assigning no dedicated identifier of the UE, using a saved dedicated identifier of the UE to communicate with the SN.

6. The method of claim 4, wherein performing the SCG activation procedure comprises receiving SCG activation acknowledge information.

7. The method of claim 6, wherein the SCG activation request information includes at least one of:

an identity (ID) of a user equipment (UE);
a quality of service (QoS) flow offloading configuration;
a SCG measurement report;
a SCG radio bearer configuration; or
a random access related configuration.

8. The method of claim 6, wherein the SCG activation acknowledge information includes at least one of:

a SCG radio bearer configuration;
a random access related configuration;
a SCG measurement report; or
a quality of service (QoS) flow offloading configuration.

9. The method of claim 6, further comprising:
receiving a random access message.

10. The method of claim 9, wherein the SCG activation request information is transmitted from a secondary node (SN) to a master node (MN) in response to receiving the random access message from a user equipment (UE).

11. The method of claim 9, further comprising:
transmitting a random access response message.

12. The method of claim 11, wherein the random access response message is transmitted from a secondary node (SN) after the SN receives the SCG activation acknowledge information.

13. An apparatus for wireless communication, comprising:

at least one memory; and
at least one processor coupled with the at least one memory and configured to cause the apparatus to:

activate a secondary cell group (SCG) in response to a detection of at least one of a high user data volume, a packet arrival at a SCG radio bearer, or a master node (MN) link failure;

perform a SCG activation procedure in response to activation of the SCG, the SCG activation procedure comprising transmitting SCG activation request information to a master node (MN), the SCG activation request information including a SCG activation reason; and in response to the completion of the SCG activation procedure, and a time alignment between a user equipment (UE) and a secondary node (SN), transmit a packet to the SCG without performing a random access procedure, wherein a time alignment occurs when a time alignment timer (TAT) is running.

14. The apparatus of claim 13, wherein the at least one processor is configured to cause the apparatus to use a saved dedicated identifier of the UE to communicate with the SN in response to assigning no dedicated identifier of the UE.

15. The apparatus of claim 13, wherein to perform the SCG activation procedure, the at least one processor is configured to cause the apparatus to receive SCG activation acknowledge information.

16. The apparatus of claim 15, wherein the SCG activation request information includes at least one of:

an identity (ID) of a user equipment (UE);
a quality of service (QoS) flow offloading configuration;
a SCG measurement report;
a SCG radio bearer configuration; or
a random access related configuration.

17. The apparatus of claim 15, wherein the SCG activation acknowledge information includes at least one of:

a SCG radio bearer configuration;
a random access related configuration;
a SCG measurement report; or
a quality of service (QoS) flow offloading configuration.

18. The apparatus of claim 15, wherein the at least one processor is configured to cause the apparatus to receive a random access message.

19. The apparatus of claim 18, wherein the at least one processor is configured to cause the apparatus to transmit a random access response message.

20. A method for wireless communication, the method comprising:

receiving configuration information regarding an inactivity timer;

starting or restarting the inactivity timer in response to an occurrence of an uplink transmission or a downlink transmission;

in response to a detected user data volume decrease or user data inactivity at a secondary cell group (SCG), after expiry of the inactivity timer, performing a SCG deactivation procedure to deactivate the SCG; and in response to the completion of the SCG deactivation procedure, and a time misalignment between a user equipment (UE) and a secondary node (SN), transmit a random access response to the UE, wherein a time misalignment occurs at a time alignment timer (TAT) expiry.

* * * * *